(No Model.)

W. DONALDSON.
WASHING MACHINE.

No. 451,757. Patented May 5, 1891.

Attest
Walter P. Keene
F. L. Middleton

Inventor
Walter Donaldson.
By Ellis Spear
Atty.

UNITED STATES PATENT OFFICE.

WALTER DONALDSON, OF WASHINGTON, DISTRICT OF COLUMBIA, ASSIGNOR TO LYMAN C. MARTIN, OF IOLA, KANSAS.

WASHING-MACHINE.

SPECIFICATION forming part of Letters Patent No. 451,757, dated May 5, 1891.

Application filed January 5, 1888. Renewed April 7, 1891. Serial No. 387,992. (No model.)

*To all whom it may concern:*

Be it known that I, WALTER DONALDSON, of Washington, in the District of Columbia, have invented a new and useful Improvement in Washing-Machines; and I do hereby declare that the following is a full, clear, and exact description of the same.

My invention relates to washing-machines of that class in which the clothing to be washed is carried in a revolving cage which is turned within a case containing the water.

Figure 1:
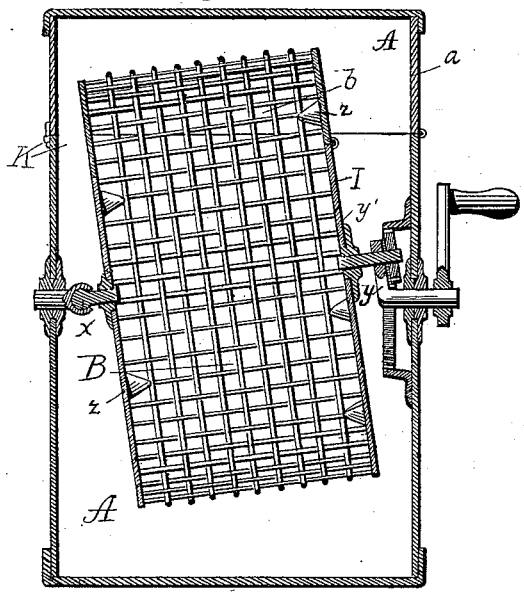
Figure 2:
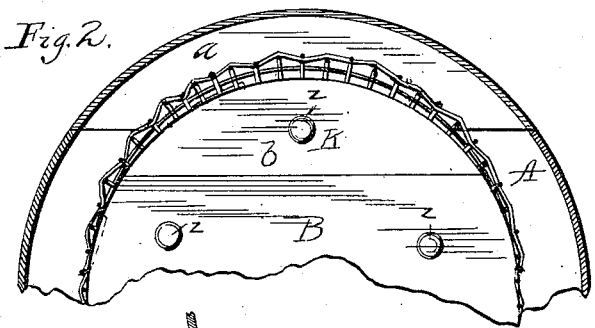
Figure 3:
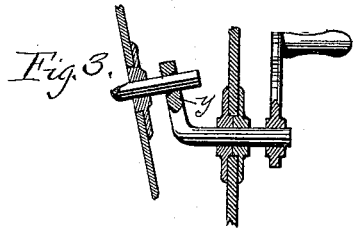

Figure 1 is a central vertical section through the case and cage. Fig. 2 is a detail sectional view of a portion of the cage of Fig. 1. Fig. 3 is a detail view of a modification.

In the drawings, A represents an ordinary case or trunk adapted to hold water, and preferably made of copper or tinned metal. It is provided, also, with an ordinary hinged cover $a$. Within this case is journaled a cylindrical cage B, having also a segmental cover $b$, hinged and provided with suitable fastenings. The sides of this cage I make of sheet metal or wood, but the periphery of wire and in the form shown in the figures. The turning of the goods is effected by the peculiar movements to which the cage is subjected, the object being to throw the goods from side to side and at the same time to cause them to be passed through the water in several directions. For these purposes the cage is hung in its bearing in a peculiar manner, as shown. On one side the journal $x$ is divided, and at this point a ball-and-socket or similar joint is provided to allow universal movement. On the other side and at the inner end of the crank-shaft a crank-arm $y$ is secured, and the remaining journal of the cage is held loosely by this arm, as in Fig. 3, the connection being such as will allow the journal slight lateral movement through the arm as the cage assumes different lateral positions. The simplest form of this connection is shown in Fig. 3, which, for convenience, is described first. The journal is square, so that the cage partakes of the rotary movement of the crank-shaft. This manner of connecting the arm-journal gives the cage a variety of movements besides the rotary motion. Its lateral position is constantly changing, being inclined first to one side and then to the other, and also it is given a revolving or oscillatory movement about the crank-shaft, all of which motion tends more effectively to change the position of the articles in relation to each other and to subject every part of them to the full action of the water. The lateral movement tends to toss the clothes from side to side, and in order to control and direct this action projections are placed upon the sides of the cage, as at $z$, Fig. 1, those upon one side being positioned opposite the spaces between those upon the opposite side.

Instead of imparting the rotary movement to the cage from the crank-shaft direct, I may employ a simple form of gearing to rotate the cage independently of the crank-arm and in the direction opposite to that in which the crank-arm moves and the cage oscillates, as shown in Fig. 3. In this form the journal is cylindrical and passes loosely through the crank-arm, and upon its outer end a pinion is secured. About the crank-shaft and in convenient position to be engaged by the pinion I fix a circular rack having internal teeth, and as the pinion revolves about the crank-shaft it is caused to rotate in the opposite direction, which rotation is imparted to the cage.

I claim as my invention—

1. In a washing-machine, the cylinder having a journal $x$, with a universal movement, and a driving-shaft with an arm on the inner end thereof carrying the other journal, substantially as described.

2. In combination, the cylinder having one of its bearings supported movably and eccentrically with the opposite bearing, and the pinion and rack for giving a rotary movement to the cylinder, substantially as described.

In testimony whereof I have signed my name to this specification in the presence of two subscribing witnesses.

WALTER DONALDSON.

Witnesses:
CHAS. L. STURTEVANT,
F. L. MIDDLETON.